US009826217B2

United States Patent
Zhang et al.

(10) Patent No.: US 9,826,217 B2
(45) Date of Patent: Nov. 21, 2017

(54) SYSTEM AND METHOD FOR ADJUSTING A BASELINE OF AN IMAGING SYSTEM WITH MICROLENS ARRAY

(71) Applicant: SZ DJI TECHNOLOGY CO., LTD., Shenzhen, Guangdong (CN)

(72) Inventors: Honghui Zhang, Shenzhen (CN); Cong Zhao, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/183,744

(22) Filed: Jun. 15, 2016

(65) Prior Publication Data
US 2016/0301916 A1   Oct. 13, 2016

Related U.S. Application Data

(63) Continuation of application No. PCT/CN2014/095917, filed on Dec. 31, 2014.

(51) Int. Cl.
*H04N 13/00* (2006.01)
*H04N 13/02* (2006.01)
(Continued)

(52) U.S. Cl.
CPC ....... *H04N 13/0246* (2013.01); *B64C 39/024* (2013.01); *B64D 47/08* (2013.01);
(Continued)

(58) Field of Classification Search
CPC . B64C 2201/123; B64C 39/024; B64D 47/08; G03B 35/10; G06K 9/6215;
(Continued)

(56) References Cited

U.S. PATENT DOCUMENTS 9,076,214 B2 * 7/2015 Tsutsumi ................... G01S 5/16
2003/0142862 A1 * 7/2003 Snow ..................... G01B 11/245
382/154
(Continued)

FOREIGN PATENT DOCUMENTS

CN   101755190 A   6/2010
CN   102164298 A   8/2011
(Continued)

OTHER PUBLICATIONS

WO, International Search Report and Written Opinion, PCT/CN2014/095917, Jun. 25, 2015.
(Continued)

*Primary Examiner* — Mohammed Rahaman
(74) *Attorney, Agent, or Firm* — Anova Law Group, PLLC (57) ABSTRACT

A system for establishing a baseline of a stereoscopic imaging device having a microlens array and methods for making and using the same. The system acquires an object distance between the microlens array and an object of interest and selects first and second lenses from the microlens array based upon the acquired object distance. The system likewise can perform simultaneous localization and mapping (SLAM) with the imaging device. In one embodiment, the system can acquire first and second stereoscopic frames with the microlens array. The system thereby can measure rotations of the second stereoscopic frame with an Inertial Measurement Unit (IMU) and match the first and second stereoscopic frames by combining the rotation data with the first and second stereoscopic frames. The system thereby can enable SLAM systems to perform more accurately and more practically in various indoor and/or outdoor environments.

26 Claims, 7 Drawing Sheets

(51) Int. Cl.
*B64C 39/02* (2006.01)
*B64D 47/08* (2006.01)
*G06K 9/62* (2006.01)
*G03B 35/10* (2006.01)
*G06T 7/73* (2017.01)
*G06T 7/593* (2017.01)

(52) U.S. Cl.
CPC ........... *G03B 35/10* (2013.01); *G06K 9/6215* (2013.01); *G06T 7/593* (2017.01); *G06T 7/73* (2017.01); *H04N 13/0011* (2013.01); *H04N 13/0022* (2013.01); *H04N 13/0203* (2013.01); *B64C 2201/123* (2013.01); *G06T 2200/21* (2013.01); *G06T 2207/10012* (2013.01); *G06T 2207/10024* (2013.01); *G06T 2207/30244* (2013.01); *H04N 2013/0081* (2013.01); *H04N 2213/001* (2013.01)

(58) Field of Classification Search
CPC ....... G06T 2200/21; G06T 2207/10012; G06T 2207/10024; G06T 2207/30244; G06T 7/593; G06T 7/73; H04N 13/0011; H04N 13/0022; H04N 13/0203; H04N 13/0246
See application file for complete search history.

(56) References Cited

U.S. PATENT DOCUMENTS

| | | | | |
|---|---|---|---|---|
| 2008/0095523 A1* | 4/2008 | Schilling-Benz | .. | H04N 5/23212 396/111 |
| 2010/0201809 A1* | 8/2010 | Oyama | .................... | G01C 3/14 348/135 |
| 2011/0080487 A1* | 4/2011 | Venkataraman | ..... | H04N 5/2253 348/218.1 |
| 2011/0211068 A1* | 9/2011 | Yokota | ................... | H04N 7/181 348/139 |
| 2012/0188420 A1 | 7/2012 | Black et al. | | |
| 2013/0038723 A1 | 2/2013 | Tsutsumi | | |
| 2014/0267633 A1 | 9/2014 | Venkataraman et al. | | |
| 2015/0035974 A1* | 2/2015 | Lavi | ....................... | G03B 15/02 348/142 |

FOREIGN PATENT DOCUMENTS

| | | |
|---|---|---|
| CN | 102300054 A | 12/2011 |
| CN | 102947670 A | 2/2013 |
| CN | 103260045 A | 8/2013 |
| CN | 103941750 A | 7/2014 |
| EP | 2400333 A2 | 12/2011 |
| JP | 2011145143 A | 7/2011 |
| JP | 2011203238 A | 10/2011 |

OTHER PUBLICATIONS

European Patent Office (EPO) The Extended European Search Report for 14909278.5 May 30, 2017 13 Pages.
Soren Riisgaard and Morten Rufus Blas, SLAM for Dummies a Tutorial Approach to Simultaneous Localization and Mapping, 2014, 126 Pages.

* cited by examiner

Fig. 1

Microlens Array

SYSTEM AND METHOD FOR ADJUSTING A BASELINE OF AN IMAGING SYSTEM WITH MICROLENS ARRAY

CROSS-REFERENCE TO RELATED APPLICATIONS

This application is a continuation of, and claims priority to, copending PCT Patent Application Number PCT/CN2014/095917, which was filed on Dec. 31, 2014. The disclosure of the PCT application is herein incorporated by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosed embodiments relate generally to digital imaging and more particularly to systems and methods for adjusting a baseline of an imaging system having a microlens array.

BACKGROUND

With development of digital image technologies, especially drone technologies, it has become a key technology to enable automatic Simultaneous Localization And Mapping (SLAM) for both indoor and outdoor applications. However, accurate SLAM has always been a difficult issue.

SLAM deals with a computational problem of constructing or updating a map of an unfamiliar environment while simultaneously keeping track of an agent's local with it. A typical SLAM deals with constructing stereoscopic frames and connecting the frames to form a continuous map.

Presently, mainstream SLAM systems usually use monocular cameras or binocular cameras to realize stereoscopic environment mapping and positioning functionalities. Some newly developed research methods use depth cameras, i.e. replacing the monocular or binocular cameras with structured light or a Time Of Flight (TOF) depth sensor. However, these approaches are greatly limited by their present applicable conditions and their relatively high costs.

In addition, some present mainstream SLAM approaches are normally implemented by combining with vision measurements. Present popular vision measuring methods often use passive monocular or binocular lenses. Similar to a pair of human eyes, the basic principle of vision measurement is to use the disparity of different vision angles to calculate a three dimensional structure of the object of interest, and to realize positioning. In case of the monocular lens, the disparity can only be generated by translations; therefore, its ability to detect a three dimensional environment depends on its motion characteristics, which ability is relatively limited.

The disparity of a binocular camera is created by a baseline between the first lens and the second lens; therefore, its ability of image stereoscopic environment is closely related with the length of the baseline. When the length is fixed, an object of too close or too far is undetectable because of existence of blind spots. Along with the development of active depth sensor (structured light, TOF), the SLAM based on active depth sensor is a new research hotspot. However, due to limitations of their performances, the design structures and the cost of those active sensors, their applicable conditions are mostly small scale indoor scenes. For example, because of the full spectrum of the sunlight, a depth sensor based on structured light is not applicable outdoors. Furthermore, TOF depth sensors, when used outdoors, depend on relatively strong energy of certain emitting light and relatively sophisticated sensor design etc.; therefore, they are not suitable for small scale flying platforms.

On the other hand, due to the limitations of their physical principles, it is difficult to use some other technologies precisely in SLAM systems, e.g. Inertial Measurement Unit (IMU), barometer and other sensors to construct accurate and widely applicable SLAM systems.

In view of the foregoing, there is a need for SLAM systems and methods that are precise and more practical under various conditions.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Since currently-available SLAM systems are not widely applicable and incapable of precise localization and mapping, a SLAM system and method that can meet the requirements by adjusting a baseline of an imaging system having a microlens array can prove desirable and provide a basis for wide range of system applications, such as drone systems and other mobile device systems. This result can be achieved, according to one embodiment disclosed in FIG. 1.

Figure 1:
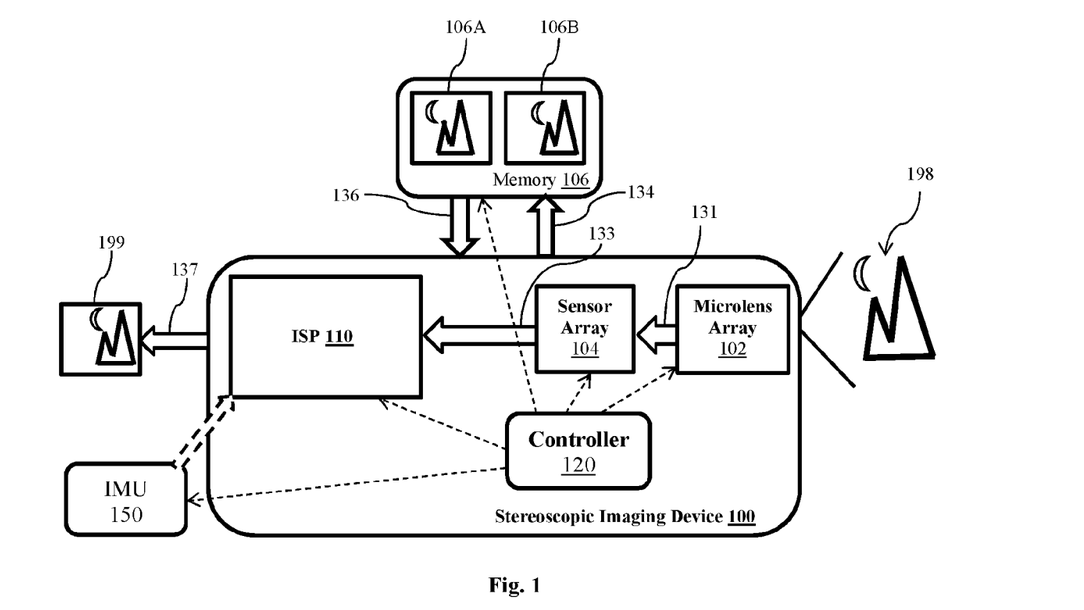
FIG. 1 is an exemplary top-level block diagram illustrating an embodiment of a stereoscopic imaging system, wherein the stereoscopic imaging system includes a microlens array and a sensor array.

Referring now to FIG. 1, an exemplary stereoscopic imaging system 100 is illustrated as having a microlens array 102 for receiving light that is reflected from an object 198 of interest. Each microlens (or lens) 102A (shown in FIG. 2) of the microlens array 102 corresponds to a respective sensor of a sensor array 104. The light received via lenses 102A of the microlens array 102 is provided to the corresponding sensors of the sensor array 104. Two lenses 102A, such as a first lens 102b and a second lens 102c, typically are configured for stereoscopic imaging; however, any suitable number of lenses 102A of the microlens array 102 can be selected. The corresponding sensors generate data flow 133, which represents images generated with sensor array 104. The number of images generated typically is equal to the number of selected number of microlenses 102A of the microlens array 102. The data flow 133 is provided to an image signal processor (ISP) 110. In this exemplary embodiment, the data flow 133 represents two images 106A and 106B generated by the sensor array 104 and stored in a memory 106, which can be an internal memory and/or an external memory. Although shown and described herein as processing pairs of images for purposes of illustration only, the stereoscopic imaging system 100 can be adapted to process any suitable number of images.

When imaging the object 198 of interest, the images generated by each selected microlens 102A and the corresponding sensor can represents the object 198 of interest from a selected vision angle. By selecting a plurality of microlenses 102A, the object 198 of interest can be imaged from a plurality of different vision angles. The ISP 110 can process the resulting images to generate a stereoscopic image 199 through a dataflow 137. In one embodiment, the ISP 110 can generate the stereoscopic image 199 for a purpose of localization as part of a SLAM system (not shown). As illustrated in FIG. 1, the microlens array 102, the sensor array 104, the memory 106 and/or the ISP 110 of the stereoscopic imaging device 100 can operate under control of a controller 120. Additionally and/or alternatively, the ISP 110 can provide the control of the stereoscopic imaging device 100, in whole or in part.

As shown FIG. 1, the exemplary stereoscopic imaging device 100 can communicate with an optional Inertial Measurement Unit (IMU) 150. The IMU 150 can serve to provide rotation measurements of the stereoscopic imaging device 100 between two time points. The ISP 110 can utilize the rotation measurements to combine two stereoscopic frames of different time points along a travel path of the stereoscopic imaging device 100 to generate continuous mappings. The continuous mappings are a second part of the SLAM systems. Even though shown as a separate (or external) component from the stereoscopic imaging device 100, the IMU 150 can also be arranged inside the stereoscopic imaging device 100.

Advantageously, the approaches disclosed herein enable the SLAM systems to perform more accurately and more practically in various indoor and/or outdoor environments. Therefore, the SLAM systems can have greater scopes of utilization compared to the conventional systems with structured lights and/or Time of Flight (TOF) depth sensors.

Figure 2:
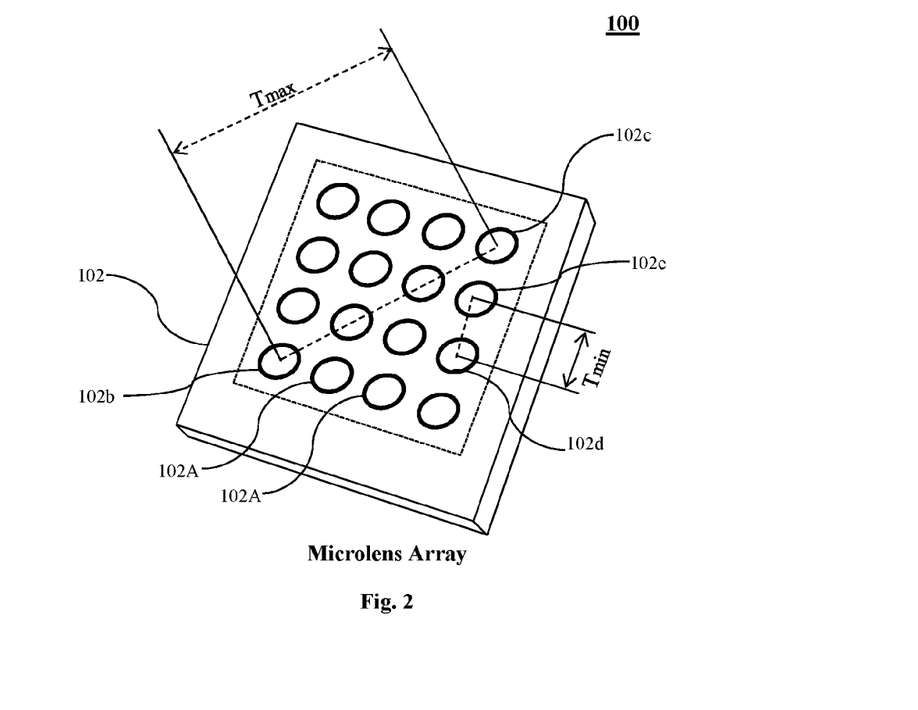
FIG. 2 is an exemplary detail drawing illustrating an embodiment of the microlens array of FIG. 1.

FIG. 2 shows an exemplary arrangement of an embodiment of the microlens array 102 of FIG. 1. The microlens array 102 of FIG. 2 is illustrated as being a four-by-four array of microlenses, providing a total of sixteen microlenses 102A. Each of the microlenses 102A can be used to take images separately and/or in combination with any number of other microlenses 102A of the microlens array 102. When the two selected microlenses 102A are used in generate images, for example, a distance between the two microlenses 102A defines a baseline of a binocular imaging device. In other words, the stereoscopic imaging device 100 forms a binocular imaging device when the two selected microlenses 102A of the microlens array 102 are used in generate images. Exemplary details regarding one embodiment of a binocular imaging device are discussed below with reference to FIG. 3.

Referring back to FIG. 2, two lenses 102A, such as a first lens 102b and a second lens 102c, of the microlens array 102 with a greatest distance define a maximum baseline $T_{max}$ of a binocular imaging device. Two lenses 102A closest to each other, such as a first lens 102d and a second lens 102e, define a minimum baseline $T_{min}$. In FIG. 2, where a four-by-four microlens array 102 is illustrated, the $T_{max}$ is a distance between the two outermost microlenses 102A located on a diagonal. The $T_{min}$ is a distance between any two adjacent microlenses 102A in a same row or column, whichever has a shorter distance.

Based on stereopsis principles, lowering the value of the baseline T can lower the lower threshold of the range of detection and/or the upper threshold of the range. Increasing T can result in opposite effects. Therefore, the stereoscopic imaging device 100 can have advantages over conventional binocular imaging devices with fixed baseline because the conventional devices cannot take both lower threshold and upper threshold into considerations.

On the other hand, the microlens array 102 can provide a predetermined range of different baselines based upon a selection of microlenses 102A as illustrated in FIG. 2. A stereoscopic location of a closer object can be calculated with microlenses 102A having smaller baselines, and the stereoscopic location of a further object can be calculated with microlenses 102A having greater baselines. Therefore, the range of a stereoscopic vision can be increased via the microlens array 102 of FIG. 2. Although shown and described with reference to FIG. 2 as providing sixteen microlenses 102A in a four-by-four array for purposes of illustration only, the microlens array 102 can include any suitable number of microlenses 102A provided in any suitable configuration or size. If provided as an array with rows and columns of microlenses 102A, the microlens array 102 can include a number of rows that is different from, or the same as, a number of columns in the microlens array 102. The spacing between adjacent microlenses 102A in the microlens array 102 can be the same, and/or different, for selected pairs of adjacent microlenses 102A in the microlens array 102.

Figure 3:
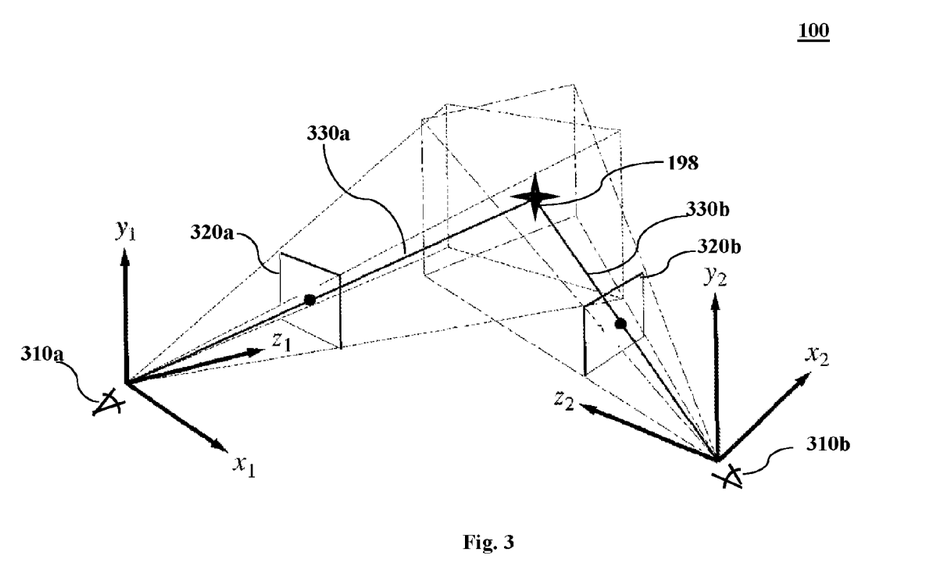
FIG. 3 is an exemplary detail drawing illustrating an alternative embodiment of the stereoscopic imaging system of FIG. 1, wherein the microlens array is used in a stereoscopy.

Referring now to FIG. 3, a system of ascertaining an object distance Z between the microlens array 102 and the object 198 of interest. FIG. 3 illustrates the use of stereoscopy with reference to two selected lenses 102A of the microlens array 102: a first lens 310a; and a second lens 310b. Even though the lenses 102A of the microlens array 102 are used in the illustration herein, any type of lens array or microlens array are applicable. Therefore, lenses 102A and microlenses 102A are fully interchangeable. Each of the microlenses 310a and 310b perceives the same object 198 of interest but in different spatial coordinates as illustrated by the coordinate axes ($x_1$, $y_1$, $z_1$) and ($x_2$, $y_2$, $z_2$). The microlenses 310a and 310b perceive the object 198 of interest along their respective optical axes 330a and 330b and thereby arrive at two different two-dimensional images 320a and 320b of the object 198 of interest. The two-dimensional images 320a and 320b are typically different, being taken from different positions and/or angles, unless the microlenses 310a and 310b are positioned such that their optical axes 330a and 330b coincide. Accordingly, under most circumstances, a binocular disparity d (represented, for example, in Equation 4) can be found between the images 320a and 320b, as described in more detail below with reference to FIG. 4.

Figure 4:
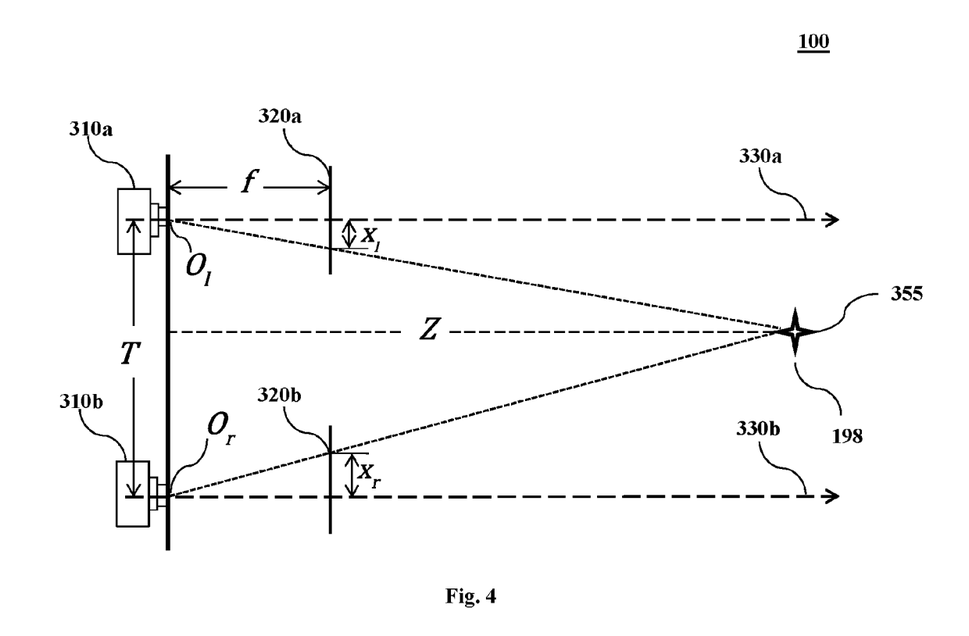
FIG. 4 is an exemplary detail drawing illustrating an alternative embodiment of the stereoscopic imaging system of FIG. 3, wherein the object distance is determined via triangulation.

Referring now to FIG. 4, two-dimensional images 320a and 320b can be compared to ascertain the object distance Z between the pair of microlenses 310a and 310b and the object 198 of interest. A method of triangulation can be used to ascertain the object distance Z using a binocular disparity d between the images 320a and 320b. Specifically, the position of an object 198 of interest having an index i, represented by its coordinates ($X_i$, $Y_i$, $Z_i$), can be given as follows:

$$X_i = \frac{T}{d}(x_i^l - c_x), \quad \text{Equation (1)}$$

$$Y_i = \frac{T}{d}(y_i^l - c_y), \quad \text{Equation (2)}$$

$$Z_i = \frac{T}{d}f \quad \text{Equation (3)}$$

where $c_x$ and $c_y$ represent respective center coordinates of the microlenses 310a and 310b, $x_i$ and $y_i$ represent the coordinates of the object 198 of interest in one or both of the images 320a and 320b, T is the baseline (in other words, the distance between the center coordinates of the microlenses 310a and 310b), f is a rectified focal length of the microlenses 310a and 310b, i is an index over multiple objects of interest 198 and/or over multiple feature points 355 of an object 198 of interest, and d is the binocular disparity between the images 320a and 320b, represented here as:

$$d_i = x_i^l - x_i^r \quad \text{Equation (4)}$$

Figure 5:
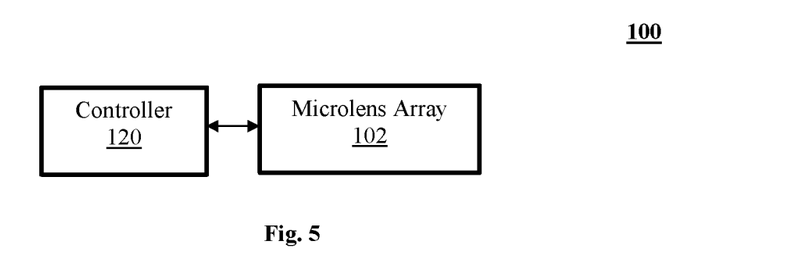
FIG. 5 is an exemplary top level block diagram, illustrating an embodiment of the stereoscopic imaging system of FIG. 1, wherein the system includes a controller for the microlens array.

FIG. 5 shows an embodiment of an exemplary method 100 for adjusting a baseline T of a stereoscopic imaging system 100. In FIG. 5, the stereoscopic imaging system 100 is shown as having the controller 120 (shown in FIG. 1) and the microlens array 102 (shown in FIG. 1). The controller 120 interacts with the microlens array 102 by controlling actions of the microlens array 102. In FIG. 5, the controller 120 can select one or more microlenses 102A from the microlens array 102 to generate a desired baseline for stereoscopic imaging; the microlens array 102 is used in taking images, which are used as bases for acquiring and or estimating an object distance Z between the microlens array 102 (shown in FIG. 1) and the object 198 of (shown in FIG. 1) interest. The object distance Z, which can be constantly changing, can be repeatedly acquired or estimated according to a predetermined time interval. In some embodiments, the time interval can be limited within a range of one sixtieth of a second to one twentieth of a second.

In addition, the controller 120 can control a receipt of images generated via the microlens array 102 and calculate a desired baseline based on the images in order to select two microlenses 310a and 310b from the microlens array 102. The calculation of the desired baseline and/or the selection of the two microlenses 310a and 310b can be based upon the repeatedly acquired changing object distance.

Figure 6:
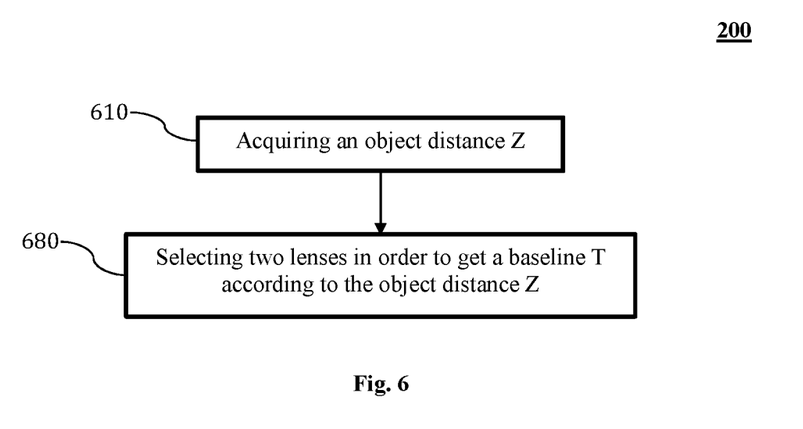
FIG. 6 is an exemplary top level flow chart illustrating an embodiment of a method of the stereoscopic imaging system of FIG. 1 based upon the object distance.

Referring now to FIG. 6, an embodiment of an exemplary method 200 for adjusting a baseline T of a stereoscopic imaging system 100 is illustrated. One embodiment of the method 200 enables the baseline T to be automatically and/or manually adjusted. At 610, an object distance Z between the stereoscopic imaging system 100 or the microlens array 102 (shown in FIG. 1) and the object 198 of (shown in FIG. 1) interest is acquired. The object distance Z can be acquired using any of several various methods, as desired. In some embodiments, the object distance Z can be acquired using a plurality of microlenses 102A (shown in FIG. 2) selected from the microlens array 102 (shown in FIG. 1) via stereopsis. For example, two microlenses 102A each can acquire a respective image 320a, 320b (shown in FIGS. 3-4) of the object 198 of interest. Overlapping portions of the acquired images 320a, 320b can be analyzed to assess the object distance Z to the object 198 of interest. Alternative and/or additionally, the object distance Z can be acquired using non-stereopsis methods, such as using a laser and/or using ultrasound. At 680, a pair of lenses 102A is automatically selected to get a baseline T according to the object distance Z. Lens selections are described in more detail with reference to FIG. 11.

Figure 7:
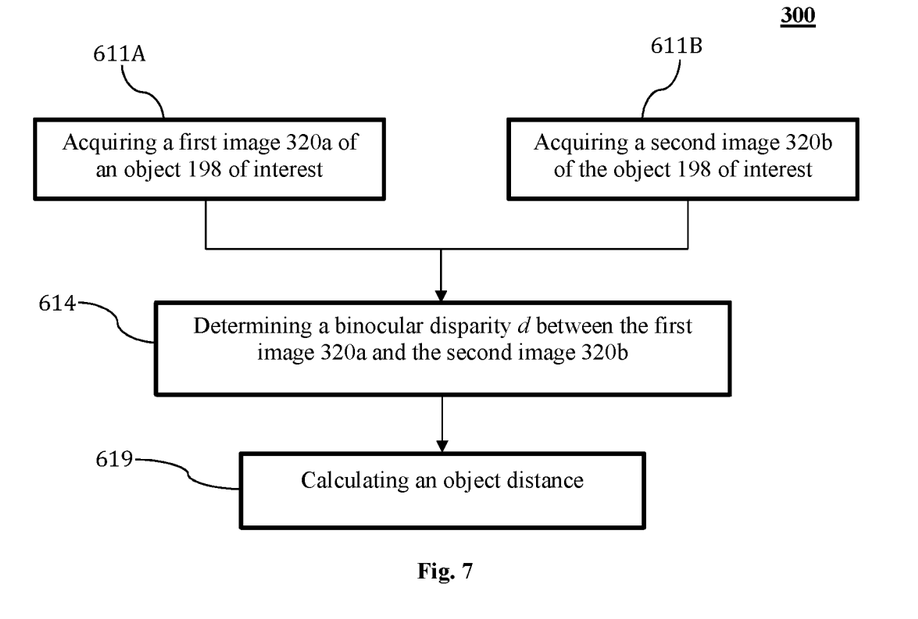
FIG. 7 is an exemplary flow chart illustrating an embodiment of a method for adjusting a baseline of the stereoscopic imaging system of FIG. 1 based upon the object distance.

An alternative embodiment of the method 300 is illustrated in FIG. 7. Here, the method 300 acquires the object distance Z using a first lens 310a and a second lens 310b based on stereopsis. At 611A, a first image 320a (shown in FIGS. 3 and 4) of the object 198 (shown in FIGS. 3 and 4) of interest is acquired using the first lens 310a. At 611B, a second image 320b (shown in FIGS. 3 and 4) of the object 198 of interest is acquired using the second lens 310b. The first and second images 320a, 320b can be acquired in any conventional manner, including simultaneously and/or successively. In a preferred embodiment, the first and second images 320a, 320b are advantageously acquired simultaneously to reduce error attributable to shifts of the objects of interest 198 and/or the stereoscopic imaging system 100 over time.

At 614, a binocular disparity d is calculated between the first image 320a and the second image 320b. Alternatively and/or additionally, a focal length of either (or both) microlens 310a, 310b can be used in determining a binocular disparity d at 614. As an exemplary embodiment for calculating the disparity d is described in more detail below with reference to FIG. 7.

At 619, the object distance Z is calculated. The object distance Z can be calculated in any suitable manner. An exemplary manner includes using the calculated binocular disparity d. For example, the object distance Z can be found as a function of the binocular disparity d, the baseline T between the first lens and the second lens 310a and 310b, and a ratified focal length f as set forth in 615. Such function can be represented as:

$$Z = f \frac{T}{X_l - X_r}$$ Equation (5)

where T is the baseline (in other words, the distance between the center coordinates of the microlenses 310a and 310b), f is the rectified focal length of the microlenses 310a and 310b, $x_l-x_r=d$ is the binocular disparity between the images 320a and 320b of the object 198 of interest, and $X_r$ is a point, on the second image 310b, matched a point represented by $X_l$ on the first image 310a.

Figure 8:
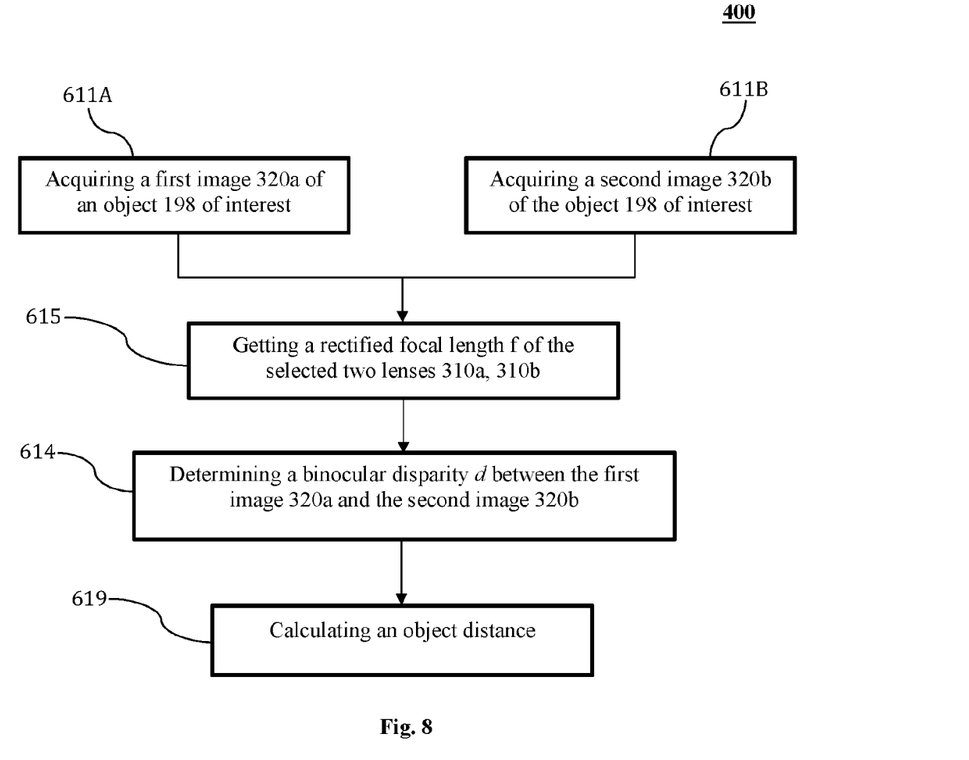
FIG. 8 is an exemplary flow chart illustrating another embodiment of a method for adjusting a baseline of the stereoscopic imaging system of FIG. 7 based upon the object distance.

Another embodiment of the system 400 is illustrated in FIG. 8. In FIG. 8, all steps are same as the system 300 shown in FIG. 7 except for that a new step is introduced. In FIG. 8, an alternative embodiment is shown as having a step, at 615, where a rectified focal length f can be calculated based on the focal lengths of the two selected microlenses 310a, 310b. Although the focal lengths of the first lens 310a and the second lens 310b usually can be same, they can also be different. All methods of calculating rectified focal lengths can be applied herein. In an embodiment, methods of calculating rectified focal lengths in an article "Stereo Camera Calibration" can be used herein, Markus Mann, *Stereo Camera Calibration*, (Dec. 10, 2004), available at http://cs.nyu.edu/courses/fall14/CSCI-GA.2271-001/06Stereo-CameraCalibration.pdf.

Figure 9:
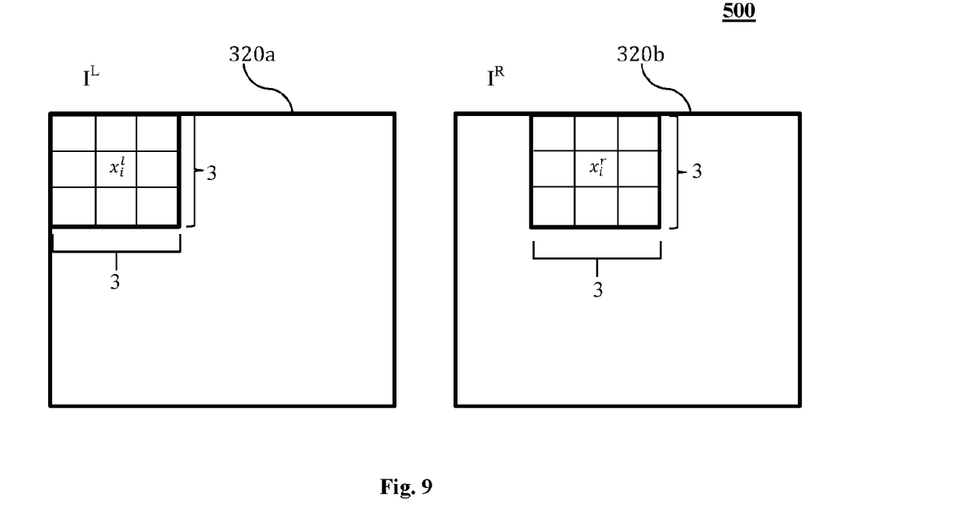
FIG. 9 is an exemplary diagram illustrating an embodiment of a method for determining the object distance in accordance with the method of FIG. 8.

Based on the discussion for FIG. 7 and FIG. 8, the disparity d can be calculated with the matching point $X_r$ on the second image 320b because $X_l$ is a known element. In FIG. 9, an exemplary embodiment of locating the matching point $X_r$ on the second image 320b is set forth for illustrative purpose only. In FIG. 9, $I^L$ represents the first image 320a, and $I^R$ represents the second image 320b of the same object 198 of interest. A point $x_i^l$ on the first image 320a is known, and a matching point $x_i^r$ on the second image 320b can be defined as a point that is "most similar" to the point $x_i^l$ of the first image 320a, which can be represented with the following equation:

$$d = \operatorname{argmin}_d |I^L(x_l) - I^R(x_l + d)|$$ Equation (6)

where d represents the disparity of the two selected microlenses 310a, 310b (shown in FIG. 3 and FIG. 4), $I^L$ is the first image 320a, $I^R$ represents the second image 320b of the same object 198 of interest, $x_l$ is the point $x_i^l$ of the first image 320a.

Because of possible matching errors, to ascertain matching accuracy and vision range, the disparity d cannot be less or greater than certain predetermined values. In a preferred embodiment under this disclosure, the disparity d is greater than 5 pixels and less than one fifth of a width of the second image 320b, which can be the same size with the first image 320a. As an illustrative example, suppose f=480, T=0.15 m, and image resolution is 320*240 pixels, an effective vision range of 1.5 m to 15.4 m can be deducted.

In determining similarities, a three-by-three pixel block is taken with the compared point in the center from each of the images 310a, 310b. When the first and second images 320a and 320b are color images, values of color components can be compared for each pixel of the three-by-three pixel block. Conversely, when the images 320a and 320b are black and white images, greyscale values for each pixel can be compared. Based on Equation 6, the point with smallest sum of value differences for all nine pixels is selected as the matching point. This process can be repeated for all selected feature points on the first image 310a.

Figure 10:
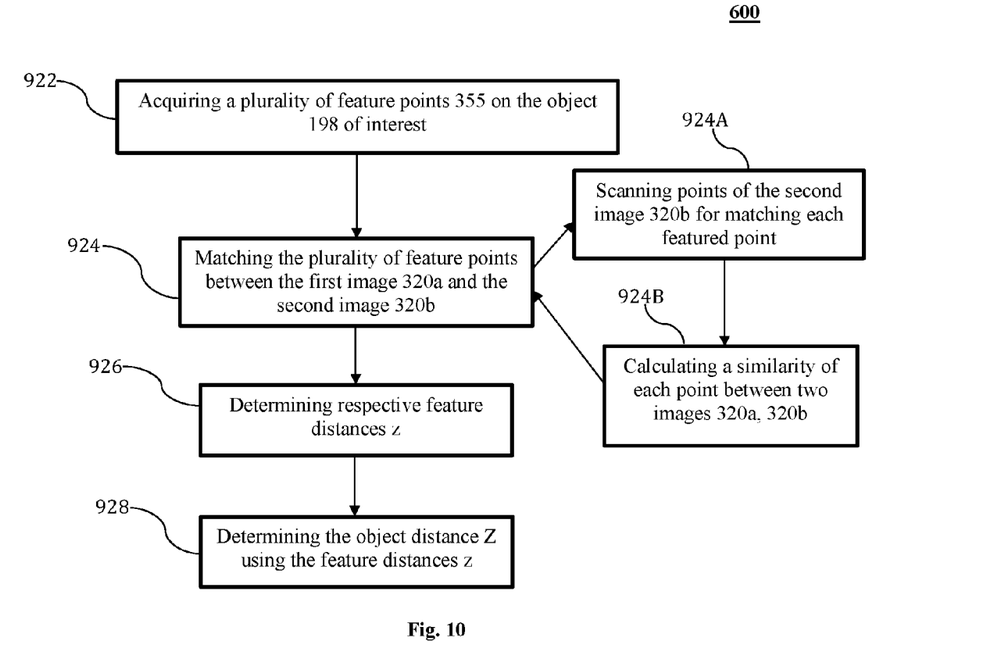
FIG. 10 is an exemplary diagram illustrating an alternative embodiment of the method of FIG. 8, wherein the method includes acquiring a rectified focal length for selected microlenses.

Turning now to FIG. 10, another alternative embodiment of the method 600 for acquiring the object distance Z using feature points 355 of the object 198 of interest is illustrated. At 922, a plurality of feature points 355 on the object 198 of interest is acquired. The feature points 355 can be selected using one or more of a variety of different methods. In one exemplary embodiment, the feature points 355 can be identified as pre-defined shapes the object 198 of interest. In another embodiment, the feature points 355 can be recognized as one or more portions of the object 198 of interest having a particular color or intensity. In another embodiment, the feature points 355 can be selected as random portions of the object 198 of interest. In another embodiment, the feature points 355 can be selected at regularly spaced intervals on the object 198 of interest, for example, every pixel, every other pixel, every third pixel, every fourth pixel, and so forth. The feature points 355 can take varying shapes and sizes, as desired. In some embodiments, a combination of methods described above can be used to select the feature points 355.

At 924, the selected feature points 355 can be matched from the first image 310a onto the second image 310b. In a preferred embodiment, the matching of the feature points consists of two steps. At 924A, a feature point 355 of the first image is selected. A matching point is scanned starting from a calculated point and along a line parallel to the centered line of the microlenses 310a, 310b. The matching starting point can be calculated based on the coordinates of the point on the first image 310a, the direction and/or the length of the baseline. Although preferably limited to only one direction along the selected line, the scanning can be performed in any of one or more predetermined directions.

At 924B, while scanning for each point, a similarity is calculated between two points with the method described in more detail herein with reference to FIG. 8, and the point of the second image 310b with the minimum sum of differences with the feature point of the first image 310a is selected.

At 926, a feature distance z between each feature point 355 and the stereoscopic imaging system 100 is found. Each feature distance z can be found in any suitable manner, including by using a binocular disparity d between the position of the feature point 355 in a first image 320a (shown in FIGS. 3 and 4) acquired by a first lens 310a (shown in FIGS. 3 and 4) and the position of the feature point 355 in a second image 320b (shown in FIGS. 3 and 4) acquired by a second lens 310b (shown in FIGS. 3 and 4). Using the binocular disparity d, the feature distance z can be found via Equations 1-4 in the manner discussed above.

At 928, the object distance Z is found using the feature distances z found at 926. Any of a variety of methods can be used to determine the object distance Z based on individual feature distances z of the object 198 of interest. In one embodiment, the object distance Z is found based on an average of the feature distances z. Exemplary types of averages can include an arithmetic mean, a geometric mean, a median, and/or a mode without limitation. In another embodiment, the object distance Z can be found by selecting one or more of the feature points 355 and acquiring the object distance Z based on the features distances z of the selected feature points 355.

Figure 11:
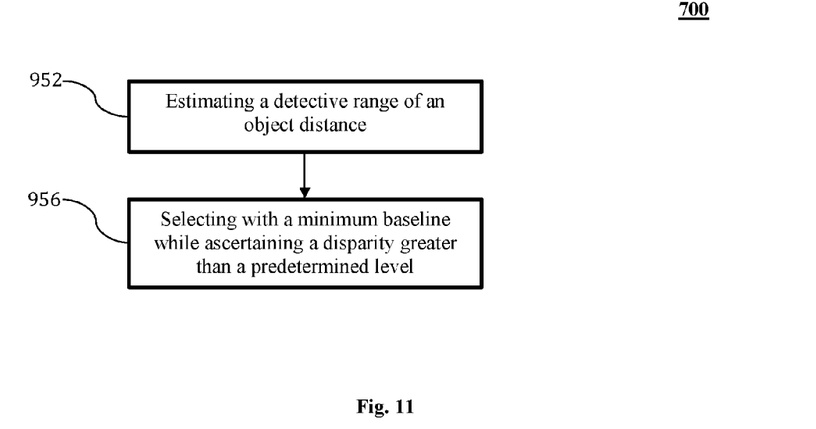
FIG. 11 is an exemplary diagram illustrating another alternative embodiment of the method of FIG. 6, wherein the baseline is estimated with a range of available baselines.

FIG. 11 illustrates an embodiment of the method 700 for selecting different lens 102A from the microlens array 102. Suppose a second image 320b is acquired at a short time interval after a first image 320a is acquired. In some embodiments, the time interval can be limited within a range of one sixtieth of a second to one twentieth of a second. Because of the shortness of the time interval, a change of the object distance Z typically is negligible and thus can be ignored in a calculation of the object distance Z and its corresponding baseline. In other words, the change of the object distance Z likely will not substantively affect a performance of the method 700. Sudden or abrupt changes of the object distance Z, however, can cause longer calculations with the exemplary method described in following paragraphs. But because of the rareness of such sudden or abrupt changes, total amount of calculations is not substantively affected.

When estimating a baseline, at 952, a detective range (Zmin to Zmax) of the object distance Z is estimated with the following equation:

$$Z = f \frac{T}{X_l - X_r} \qquad \text{Equation (7)}$$

wherein Z is the object distance between the microlens array 102A and the object 198 of interest, f is a rectified focal length of a first lens 310a and a second lens 310b, and T is the baseline between two the first and second lens 310A, 310B, $x_l$ is a feature point on the first image 320a and $x_r$ is a matching point corresponding to $x_l$. The calculation of the rectified focal length f is described with reference to FIG. 8. Here, the feature points $x_l$ and $x_r$ can be selected in the manner discussed in more detail above with reference to FIG. 10. In some embodiments, $x_l$ and $x_r$ can be selected from a point having a minimum object distance and/or having a maximum object distance. Preferably, $x_l$ and $x_r$ can be selected from a point with an average object distance. The average object distance can be determined in any conventional manner, including by determining an arithmetic mean, a geometric mean, a median, and/or a mode without limitation. In a preferred embodiment, two closest lenses 310a, 310b available on the microlens array 102 are selected to provide a shortest baseline T.

When the detective range (Zmin to Zmax) is estimated, the baseline T can be calculated based on a predetermined disparity d, the rectified focal length f and the detective range (Zmin to Zmax). In order to calculate the baseline T, at 956, the following equation can be applied to acquire a selection of the first lens 310a and the second lens 310b:

$$T = \frac{Zd}{f} \qquad \text{Equation (8)}$$

wherein d is the disparity generated by the first lens 310a and the second lens 310b, Z is the object distance, and f is a rectified focal length of a first lens 310a and a second lens 310b. In some preferred embodiments, d is selected as no less than 10 pixels. In some other embodiments, the object distance Z can be a minimum object distance Zmin as calculated above. In a preferred embodiment, the baseline T is selected as a smallest available distance with any two lenses of the microlens array while a condition d>10 is satisfied in Equation 8. After the initial selection of the two lenses 310a, 310b, the disparity can be increased or decreased by selecting different lenses 102A. In a preferred embodiment, the disparity needs only be increased.

Figure 12:
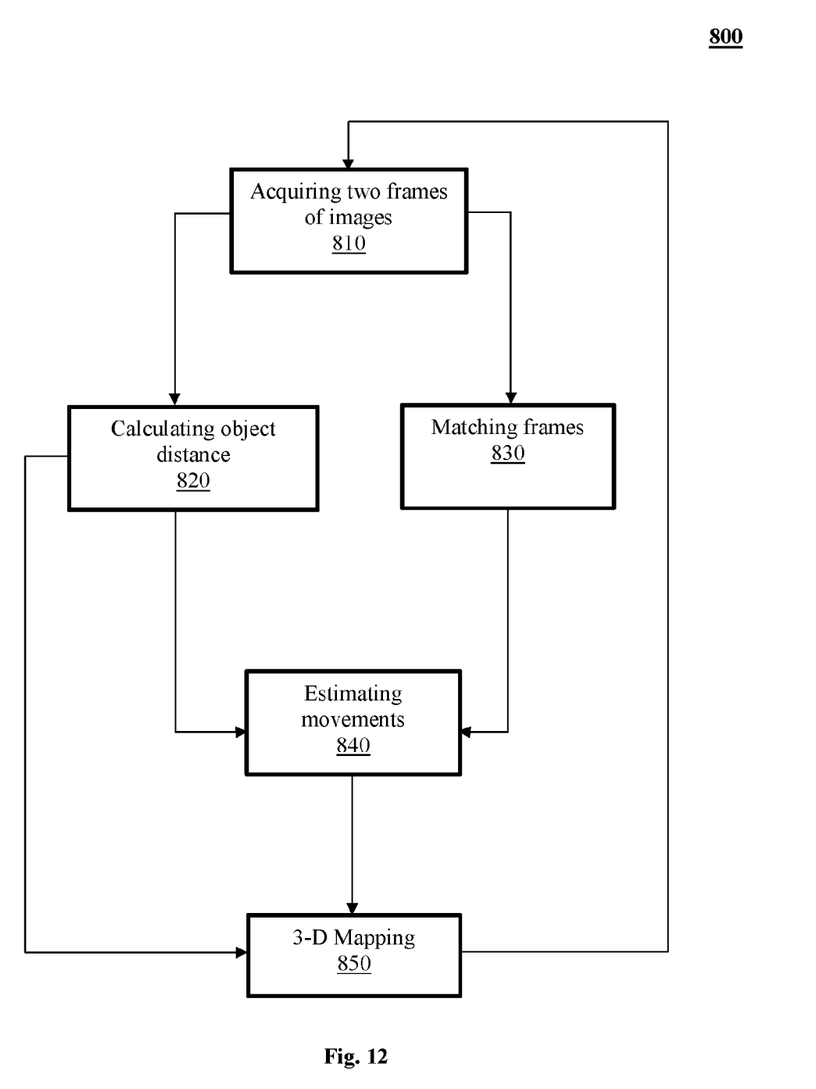
FIG. 12 is an exemplary top level diagram illustrating an embodiment of a method for Simultaneous Localization And Mapping (SLAM).

FIG. 12 illustrates an exemplary embodiment of a method 800 for performing Simultaneous Localization And Mapping (SLAM). In FIG. 12, the stereoscopic imaging device 100 (shown in FIG. 1) acquires two stereoscopic frames of images, at 810. The two frames can be acquired in any suitable manner, including in accordance with any of the methods described above with reference to FIG. 1 through FIG. 11. At 820, the object distance Z of the object 198 of interest can be calculated. The object distance Z can be calculated in any suitable manner, including in accordance with any of the methods described above with reference to FIG. 1 through FIG. 11. At 830, the two frames are matched by matching feature points on the first and second frames. At 840, the six movements in three translation movements and three rotations are estimated with the acquired frames. The rotations can be acquired with an Inertial Measurement Unit (IMU) 150 to get rotation data, and translations are calculated based on the rotation data.

When the rotations and the translations are acquired, the measurements are applied to the frames, as 850, as described in the following sections. Also at 850, the next frame of image is acquired and the system repeats the process in order to calculate the newly acquired frame. The process continues over and over to realize uninterrupted mappings.

Figure 13:
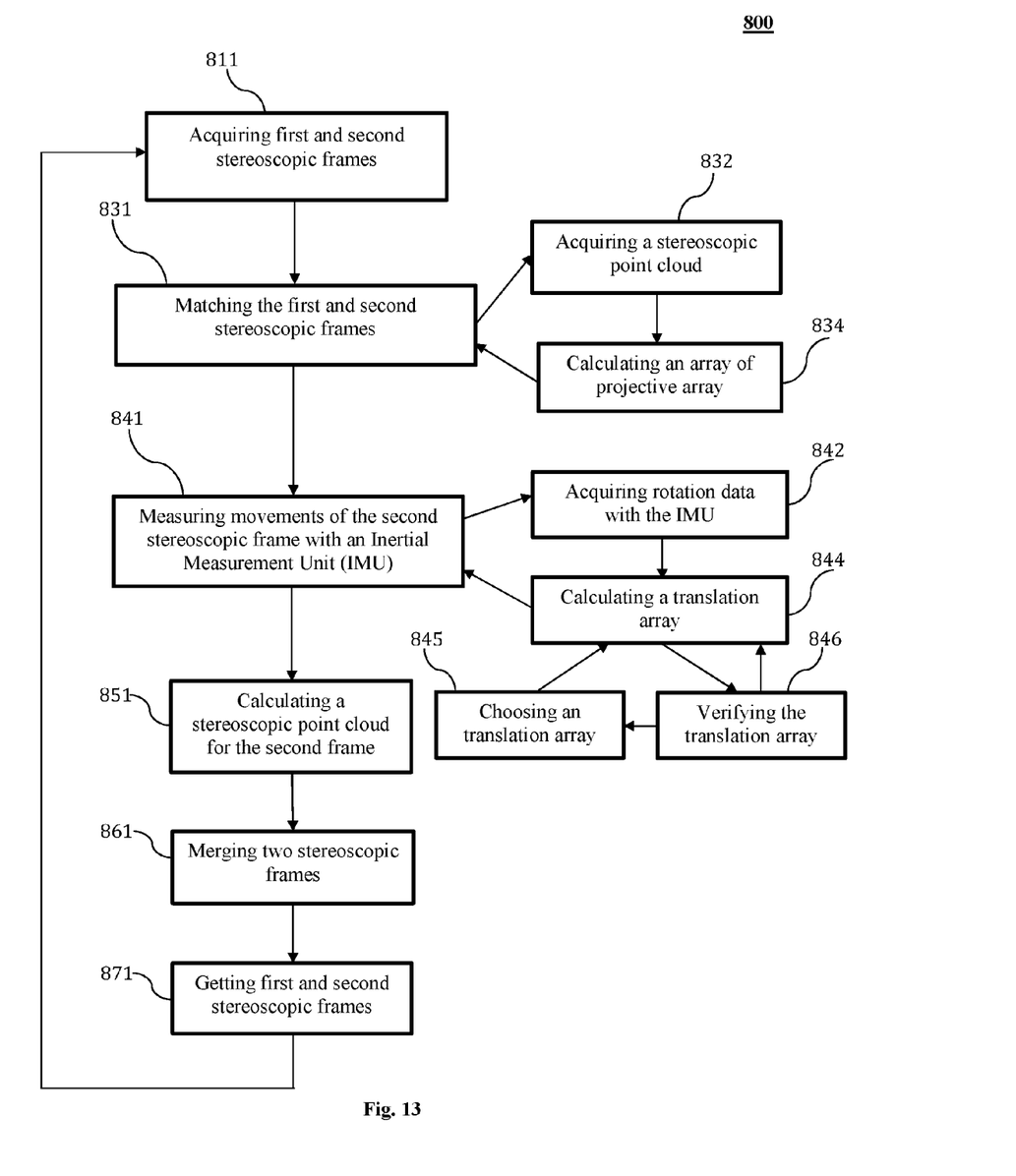
FIG. 13 is an exemplary diagram illustrating an alternative embodiment of the method of FIG. 10, wherein pairs of stereoscopic images are matched.

FIG. 13 illustrates an alternative embodiment of the method 800 (shown in FIG. 12). As illustrated in FIG. 12, two stereoscopic frames are acquired with any of the methods described with reference to FIG. 1 to FIG. 11, one first stereoscopic frame and a second stereoscopic frame, at 811. As described with reference to FIG. 1 to FIG. 11, the stereoscopic frames consists of multiple stereoscopic points and each of those points is represented with x, y and z coordinate values. The two frames described herein are acquired at different time points along with a travel path of the stereoscopic imaging device 100 (shown in FIG. 1).

Matching the first frame and the second frames at 831 consists of two steps. As the first step of 831, a stereoscopic point cloud is acquired based on the first frame $\{P_1, P_2, P_3 \ldots, P_n\}$ at 832. Each P is a feature point of the first frame. In an x-y plane, the stereoscopic point cloud can be represented with $\{(x_1^1, y_1^1), (x_2^1, y_2^1), \{(x_3^1, y_3^1), \ldots, \{(x_n^1, y_n^1)\}$. The number of the feature points acquired various based on a processing speed, a size of the frame, a resolution of the frame as well as a calculation capacity of the controller 120 etc. In a typical embodiment disclosed herein, the number of points can be in an exemplarily range of 100 to 200.

As a second step of matching the frames at 831, a second projective array is calculated in the second frame $\{(x_1^2, y_1^2), (x_2^2, y_2^2), \{(x_3^2, y_3^2), \ldots, \{(x_m^2, y_m^2)\}$ at 834. Each of the points $(x_i^2, y_i^2)$ of the second projective array represents a matched point, projected in an x-y plane, corresponding to a point $P_j$ or $(x_j^1, y_j^1)$ of the point cloud of the first frame. A size of the second projective array can be same as a size of the cloud array, in case all points in the cloud array $\{P_1, P_2, P_3 \ldots, P_n\}$ are matched onto the second frame. However, in most cases, the size of the second projective array is less than the size of the cloud array $\{P_1, P_2, P_3 \ldots, P_n\}$ because not all points can be matched onto the second frame. Matching of the point cloud of the first frame to the second frame can be accomplished by the method described with reference to FIG. 9, in which three-by-three pixels are compared to determine the similarity of two points.

Next, at 841, movements of the second stereoscopic frame are measured in related to the first stereoscopic frame 841 consists of three steps. At 842, an IMU 150 is configured to measure rotation measurements which are passed to the controller 120. The rotation measurements are represented with a three dimensional array R. With the rotation measurement array R, a relationship between the point cloud array of the first frame and the projected point array of the second frame can be represented as:

$$RP_j + T = \mu \begin{pmatrix} x_j \\ y_j \\ 1 \end{pmatrix} \qquad \text{Equation (9)}$$

wherein R is a three-dimensional array representing the rotation measurements, Pj is a stereoscopic point of the first frame, T represents a three-dimensional array of translation of the second frame to be calculated and µ is a random number acting as a factor.

To guaranty an accuracy of the relative rotation array measured by the IMU 150, the interval between the point of time when the first frame is taken and the point of time when the second frame is taken is relatively shot. The interval between the first frame and the second frame usually can be within a range of twentieth to sixtieth seconds depending on the requirements of actual applications.

There exist three unknowns (Tx, Ty, Tz) in Equation 9; therefore, by mathematical principles, three equations are needed to jointly solve the array T with the three unknowns, at 844. However, each of the projected points has only two values in $x_i$ and $y_i$. So, in order to resolve three unknowns in T, we need to join three equations out of four equations available for two such points.

In real life, because of errors and/or inaccuracies in matching the points between the first stereoscopic frame and second stereoscopic frame, the calculated T could not be accurate. At 846, the calculated translation array T is introduced into the Equation 9, and calculate to determine the number of points that conform to the relationship defined in the equation. Then, another pair of points can be used in solving T at 844, which is then used to calculate to determine the number of points that conform to the relationship of Equation 9 at 846. This process iterates for a predetermined number of pairs of points, and the results are a predetermined number of Ts accompanied with each T's numbers of points of conformance to Equation 9.

At 845, the numbers of conformed points are compared and a T is chosen with the greatest number of conformed points.

At 851, with the calculated T and measured R, we can acquire the stereoscopic point cloud for the second stereoscopic frame using a modified Equation 9:

$$RP_j + T = \mu \begin{pmatrix} x_j \\ y_j \\ z_j \end{pmatrix} \qquad \text{Equation (10)}$$

At 861, the calculated stereoscopic point cloud of the second stereoscopic frame can be merged with the stereoscopic point cloud of the first stereoscopic frame. The first stereoscopic frame can be replaced with the second stereoscopic frame and acquires a new second stereoscopic frame at a next time point, at 871. The process described with reference to FIG. 13 can be repeated again and again to perform continuous localization and mappings.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A method for establishing a baseline of a stereoscopic imaging system having a microlens array, comprising:
   acquiring an object distance between the microlens array and an object of interest based on images of the object of interest taken by the microlens array;
   dynamically selecting a first lens and a second lens from among a plurality of lenses of the micro lens array based upon said acquiring, comprising:
      estimating a detective range of the object distance based on a minimum baseline available for the microlens array, a rectified focal length and a predetermined disparity range;
      calculating a baseline range based on the estimated detective range of the object distance; and
      selecting with a minimum baseline while ascertaining a disparity greater than a predetermined level; and
   establishing the baseline based upon said selecting the first lens and the second lens.

2. The method of claim 1, further comprising automatically adjusting the baseline, wherein the object distance is changing, and wherein the baseline is based upon the changing object distance.

3. The method of claim 2, further comprising calibrating at least one of a translational extrinsic parameter and a rotational extrinsic parameter of the stereoscopic imaging system after said automatic adjustment of the baseline.

4. The method of claim 2, wherein the stereoscopic imaging system is installed aboard an unmanned aerial vehicle ("UAV"), and wherein said automatically adjusting is dependent on a travel mode of the UAV.

5. The method of claim 1, wherein said acquiring the object distance comprises:
   acquiring a first image of the object of interest via the first lens;
   acquiring a second image of the object of interest via the second lens;
   determining a binocular disparity between the first image and the second image; and
   calculating the object distance based upon said determining the binocular disparity.

6. The method of claim 5, wherein said acquiring the object distance further comprises calculating a rectified focal length based on focal lengths of the first lens and the second lens prior to said determining the binocular disparity.

7. The method of claim 6, wherein said acquiring the object distance comprises:
   acquiring a plurality of feature pixels on the first image; and
   matching the plurality of feature pixels of the first image with pixels of the second image.

8. The method of claim 7, wherein said determining the binocular disparity comprises determining the binocular disparity of at least five pixels and no more than one fifth of a width of an image.

9. The method of claim 8, wherein said matching the plurality of feature pixels comprises:
   scanning the second image to identify a pixel of the second image that matches a selected feature pixel of the first image; and calculating a similarity between the selected feature pixel of the first image and the pixel of the second image.

10. The method of claim 9, wherein said calculating the similarity comprises comparing the selected feature pixel of the first image with a three-by-three pixel area centered around the pixel of the second image.

11. The method of claim 10, wherein said comparing a three-by-three pixel area comprises comparing a sum of differences for each color component of each pixel of color images or a sum of differences of grayscale values of each pixel of black and white images.

12. The method of claim 7, wherein said acquiring the object distance further comprises:
determining respective feature distances between the microlens array and each of points of the object of interest corresponding to the feature pixels; and
determining the object distance based on an average of the feature distances.

13. The method of claim 1, wherein said selecting the first lens and the second lens comprises increasing the baseline until a field-of-vision of the first lens overlaps with a field-of-vision of the second lens by at least fifty percent.

14. A method for establishing a baseline of a stereoscopic imaging system having a microlens array, comprising:
acquiring an object distance between the microlens array and an object of interest by:
acquiring a first image of the object of interest via a first lens of the microlens array,
acquiring a second image of the object of interest via a second lens of the microlens array,
calculating a rectified focal length based on focal lengths of the first lens and the second lens,
determining a binocular disparity between the first image and the second image, and
calculating the object distance based upon said determining the binocular disparity;
dynamically selecting the first lens and the second lens from the microlens array from among a plurality of lenses of the microlens array based upon said acquiring the object distance, wherein selecting the first lens and the second lens includes:
estimating a detective range of the object distance based on a minimum baseline available for the microlens array, a rectified focal length and a predetermined disparity range;
calculating a baseline range based on the estimated detective range of the object distance; and
selecting with a minimum baseline while ascertaining a disparity greater than a predetermined level; and
establishing the baseline based upon said selecting the first lens and the second lens.

15. An apparatus for establishing a baseline of a stereoscopic imaging system, comprising:
a microlens array having a plurality of lenses each being configured to acquire an image individually or in any combination with one or more other lenses; and
a controller configured to:
dynamically select two lenses based upon an object distance between said microlens array and an object of interest acquired based on images of the object of interest taken by the microlens array,
establish the baseline via selecting a first lens and a second lens from among the plurality of lenses of said microlens array, wherein selecting the first lens and the second lens includes:

estimating a detective range of the object distance based on a minimum baseline available for the microlens array, a rectified focal length and a predetermined disparity range;
calculating a baseline range based on the estimated detective range of the object distance; and
selecting with a minimum baseline while ensuring a disparity greater than a predetermined level.

16. The apparatus of claim 15, wherein said controller is configured to acquire a changing object distance, and select the first lens and the second lens based upon the changing object distance.

17. The apparatus of claim 16, wherein said controller is configured to dynamically adjust the baseline based upon the changing object distance between the micro lens array and the object of interest.

18. The apparatus of claim 17, wherein said controller is configured to:
acquire a first image of the object of interest via the first lens;
acquire a second image of the object of interest via the second lens;
determine a binocular disparity between the first image and the second image; and
calculate the object distance based upon the binocular disparity.

19. The apparatus of claim 18, wherein said controller is configured to calculate a rectified focal length based upon focal lengths of the first lens and the second lens.

20. The apparatus of claim 19, wherein said controller is configured to acquire a plurality of feature points of the first image, and match the plurality of feature points of the first image with points of the second image.

21. The apparatus of claim 20, wherein said controller is configured to determine the binocular disparity of at least five pixels and no more than one fifth of a width of the first image or the second image.

22. The apparatus of claim 21, wherein said controller is configured to scan the second image to identify a point that matches a selected feature point of the first image, and to calculate a similarity between the selected feature point of the first image and the point.

23. The apparatus of claim 22, wherein said controller is configured to calculate the similarity by comparing each selected feature point of the first image with a three-by-three pixel area centered around the point on the second image.

24. The apparatus of claim 23, wherein each selected feature point is compared via a sum of differences for each color component of each pixel of color images or a sum of differences of grayscale values of each pixel of black and white images.

25. The apparatus of claim 20, wherein said controller is configured to determine respective feature distances between the micro lens array and each of the feature points, and to determine the object distance using the feature distances.

26. The apparatus of claim 15, wherein said controller is configured to increase the baseline until a field-of-vision of the first lens overlaps with a field-of-vision of the second lens by at least fifty percent.

* * * * *